United States Patent [19]
Lee

[11] Patent Number: 5,689,311
[45] Date of Patent: Nov. 18, 1997

[54] AFTER IMAGE REDUCER

[75] Inventor: Chong U. Lee, San Diego, Calif.

[73] Assignee: QUALCOMM Incorporated, San Diego, Calif.

[21] Appl. No.: 528,579

[22] Filed: Sep. 15, 1995

[51] Int. Cl.$^6$ .................................................. H04N 5/213
[52] U.S. Cl. .......................... 348/674; 348/658; 348/671
[58] Field of Search ................................. 348/607, 658, 348/671, 673, 674, 687

[56] References Cited

U.S. PATENT DOCUMENTS

4,975,772  12/1990  Fujita ........................................ 358/166
5,574,572  11/1996  Malinowski et al. .................... 358/451

Primary Examiner—Mark R. Powell
Assistant Examiner—Vincent E. Kovalick
Attorney, Agent, or Firm—Russell B. Miller; Sean English; Linli L. Golden

[57] ABSTRACT

A method and apparatus for reducing after images in motion video display. In the present invention, an intensity scaled image of a previous frame or set of frames is subtracted from the present frame before displaying the present frame. In the exemplary embodiment, the scaling factor is determined by measuring the intensity of the after image for the display device. In a preferred embodiment, the after image reduction system of the present invention takes into account the nonlinearities of the display device. That is the nonlinear relationship between the voltage applied to a display device and the intensity of the resulting display.

30 Claims, 5 Drawing Sheets

AFTER IMAGE REDUCER

BACKGROUND OF THE INVENTION

I. Field of the Invention

The present invention relates to motion video. More particularly, the present invention relates to a novel and improved method and apparatus for reducing after images in motion video.

II. Description of the Related Art

In traditional motion picture projection, the film is drawn from its reel by even paced jerks past the lens of a picture head. As each frame comes into position behind the lens, it is held still for an instant; a shutter opens allowing a beam of light to pass through the film and lens and project the image onto a remote screen. When the shutter closes, the film is jerked down and the next frame is positioned behind the lens. A person watching the rapid succession of images sees this as continuous motion.

Other methods of motion video display have been developed using various other display devices, such as cathode ray tubes, photoconductors, liquid crystals, such as in liquid crystal displays (LCD) or liquid crystal light valves (LCLV), and combinations of these display devices. Some of these devices have an image memory, referred to herein as an after image. The after image is a reduced energy remnant of a previously displayed frame or set of frames that is an artifact of the inability of devices such as those enumerated above to change instantaneously from frame to frame. The result of after images is to reduce the perceptual quality of the displayed motion video.

The present invention presents a method and apparatus for reducing after images in motion video display.

SUMMARY OF THE INVENTION

The present invention is a novel and improved method and apparatus for reducing after images in motion video display. In the present invention, an intensity scaled image of a previous frame or set of frames is subtracted from the present frame before displaying the present frame.

In the exemplary embodiment, the scaling factor is determined by measuring the intensity of the after image for the display device. In an exemplary embodiment of the measuring apparatus a bright frame is displayed, followed immediately by a totally dark frame or series of dark frames, and the intensity of the light is measured on what should be a totally dark frame. From this measurement, the percentage of light which remains is measured as a fraction of the light in the previous frame. As a first estimate, the display system can be assumed to be linear and the scaling factor is the percentage of light in the after image. In a preferred embodiment, the after image reduction system of the present invention takes into account the nonlinearities of the display device. That is the nonlinear relationship between the voltage applied to a display device and the intensity of the resulting display.

Once the prediction model for the after image has been determined, the present invention stores the previous frame of pixel data in a frame buffer. This frame of data is modeled to provide an after image estimate which is subtracted from the current frame of image data, reducing or eliminating the after image and increasing the perceptual quality of the motion video.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1A:
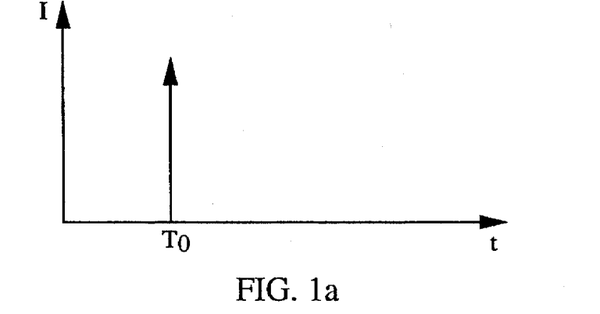
FIGS. 1a–1b are illustration of the exponential decay of a display when excited by an impulse function.
Figure 1B:
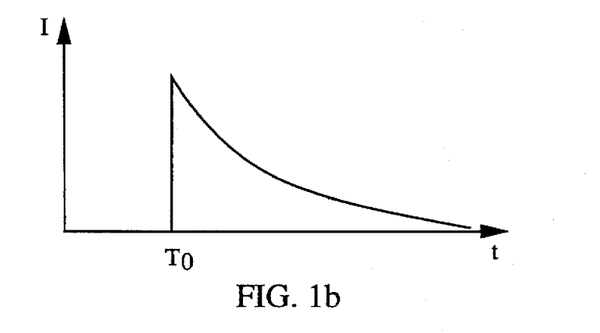

FIG. 1a illustrates a voltage impulse which when applied to a display device results in the light intensity function illustrated in FIG. 1b. Display devices include cathode ray tubes (CRT), liquid crystals, such as in liquid crystal displays (LCD) or liquid crystal light valves (LCLV), or any combination of the above. FIG. 1b illustrates the resulting light intensity displayed as a result of the applied voltage signal as a function of time.

The light intensity function of FIG. 1b is illustrated as having an exponential decay. The resulting light intensity of a device having an exponential decay signal, y(t), can be described as:

$$y(t) = f(x(t)) * e^{-t/\tau}, \qquad (1)$$

where x(t) is the applied voltage signal, $\tau$ is the time constant of the decay function, and f(n) is the relationship between the applied voltage, x(t), and the resulting initial light intensity for the display device.

Figure 2A:
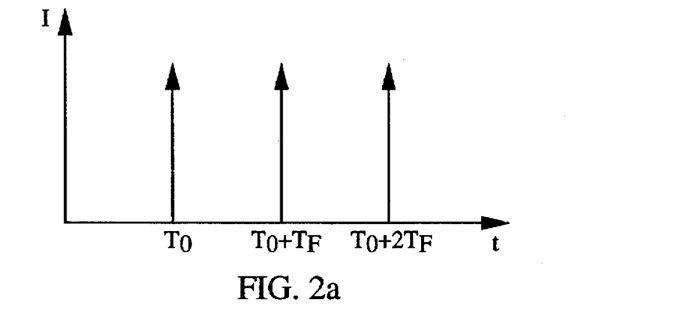
FIGS. 2a–2b are illustration of the exponential decay of a display when excited by a series of impulse functions.
Figure 2B:
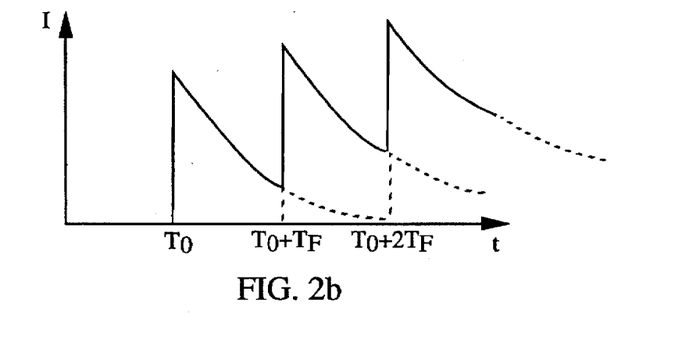

FIGS. 2a and 2b illustrate the problem that results in motion video from the exponential decay of a display. Motion video is created by displaying a series of images in rapid succession. This rapid succession of images can be illustrated as a train of voltage impulses as in FIG. 2a applied to a display device.

Each impulse in the series of impulses results in the output of a separate exponentially decaying function as illustrated in FIG. 2b. FIG. 2b illustrates the undesirable additive property of these output functions. Because the output function of a previous impulse has not decayed to zero prior to the excitation by the subsequent voltage impulse, there is an additive characteristic, referred herein as smearing or blurring, between consecutive frames.

Figure 3:
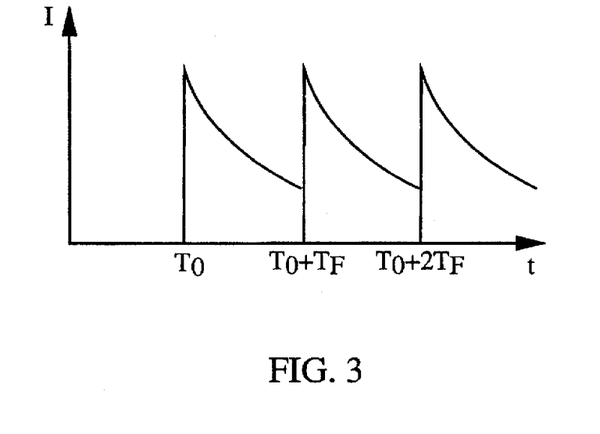
FIG. 3 is a illustration of the desired response of a display when excited by a series of impulse functions.

The impulse functions are separated by a frame period $T_f$, which corresponds to a frame rate of $1/T_f$. Typical frame rates vary between 25 and 75 frames per second. FIG. 3 illustrates a preferred output signal for the input series of voltage impulses illustrated in FIG. 2a. Note that at the frame boundaries, $T_0$, $T_0+T_f$, $T_0+2T_f$, the previous frames have entirely disappeared and the only information displayed is that of the current frame.

Figure 4:
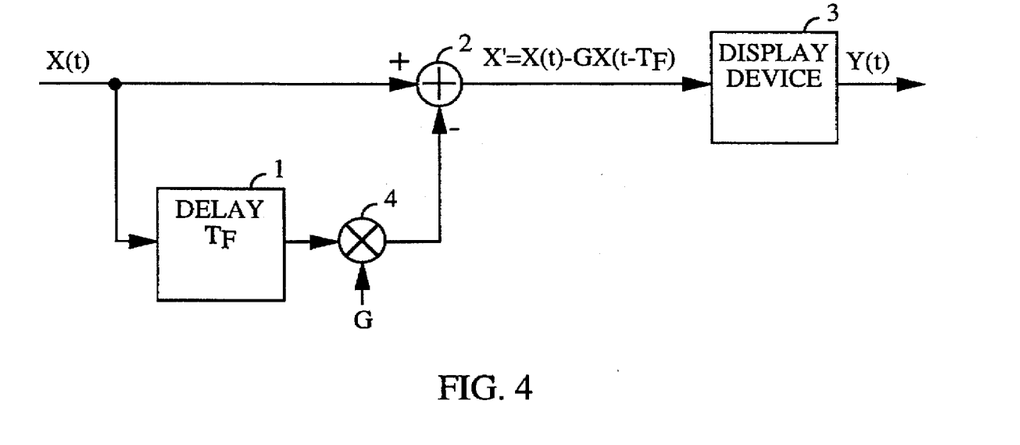
FIG. 4 is a simplified block diagram of the present invention.

FIG. 4 illustrates the idealized solution to the problem of after images. In the idealized solution, the after image of frame $x(t-T_f)$ is subtracted from frame $x(t)$ before exciting the display device (e.g. CRT, LCLV, etc.). Thus, the current frame of image data x(t) is provided to summing element 2 and delay element 1. Delay element 1 outputs the stored image data from the previous frame, $x(t-T_f)$ to multiplier 4.

Multiplier 4 scales the intensity of the previous frame of image data by scaling factor g, which is specific for display device 3, and provides the intensity scaled image data to the subtracting input of summer 2. In summer 2, the intensity scaled image data from the previous frame, the estimated after image, is subtracted from the image data of the current frame. The image data from summing element 2 is provided to display device 3 and displayed for the user.

Although the display device response is not exactly exponential, this does not pose any problems for implementation of the present invention, because what is important is the total amount of light in the after image. The intensity of the light integrated over the time period is most perceptually significant. In this approximation of the after image, g is the ratio of total amount of light in the after image relative to the total amount of light in the frame causing the after image.

Because there is currently no known method for generating negative light, display device 3 cannot accept negative values. Thus, the dynamic range of the signal provided to the display device must be kept at a nonnegative value. If a display were developed which was capable of accepting negative values, there would be no need to restrict the range of the input signal, and the present invention would otherwise be unaffected.

In displaying motion video, the problem associated with video after images is easily identified when a bright object from a preceding frame moves across the dark background of a subsequent frame. Less apparent, but still affecting the image quality is the blurring of moving details caused by after images in consecutive frames of similar intensity. If the motion of a texture detail stays within the object boundary, it usually has the same brightness as the texture detail in the previous frame. Therefore, a complete cancellation of the previous frame after image is possible and not limited by the "negative light" problem.

Display device 3 usually has nonlinear characteristics, so the intensity of the light displayed does not vary linearly with the voltage applied to display device 3. The Society of Motion Picture and Television Engineers (SMPTE) standardized this nonlinear relationship in the recommended practices in SMPTE-240M that gives parameters of HDTV scanning and video signal levels as well as color primaries and gamma characteristic. The gamma characteristic refers to the nonlinear function that maps the applied voltage value to the resulting light intensity. In SMPTE-240M, the recommended relationship for determining intensity of the light displayed by a display device (I) in terms of voltage applied to the display device (V) is approximately given by the relationship:

$$I = V^\gamma, \quad (2)$$

where $\gamma=2.2$. This relationship is somewhat simplified, because there is a small linear region in the SMPTE-240M standard which is defined in a piecewise definition.

In addition, there are other sources of nonlinearities that are associated with display devices. Nonlinearities exist at the low and high ends of the signal scale. There is blooming and overlap between scan lines. In addition, there is saturation at the high signal end of some display devices, due to phosphor, photoconductor, or liquid crystal. In the face of these limitations, one of the goals of the present invention is to linearize the display response, as much as possible, by making use of calibration measurements.

Figure 5:
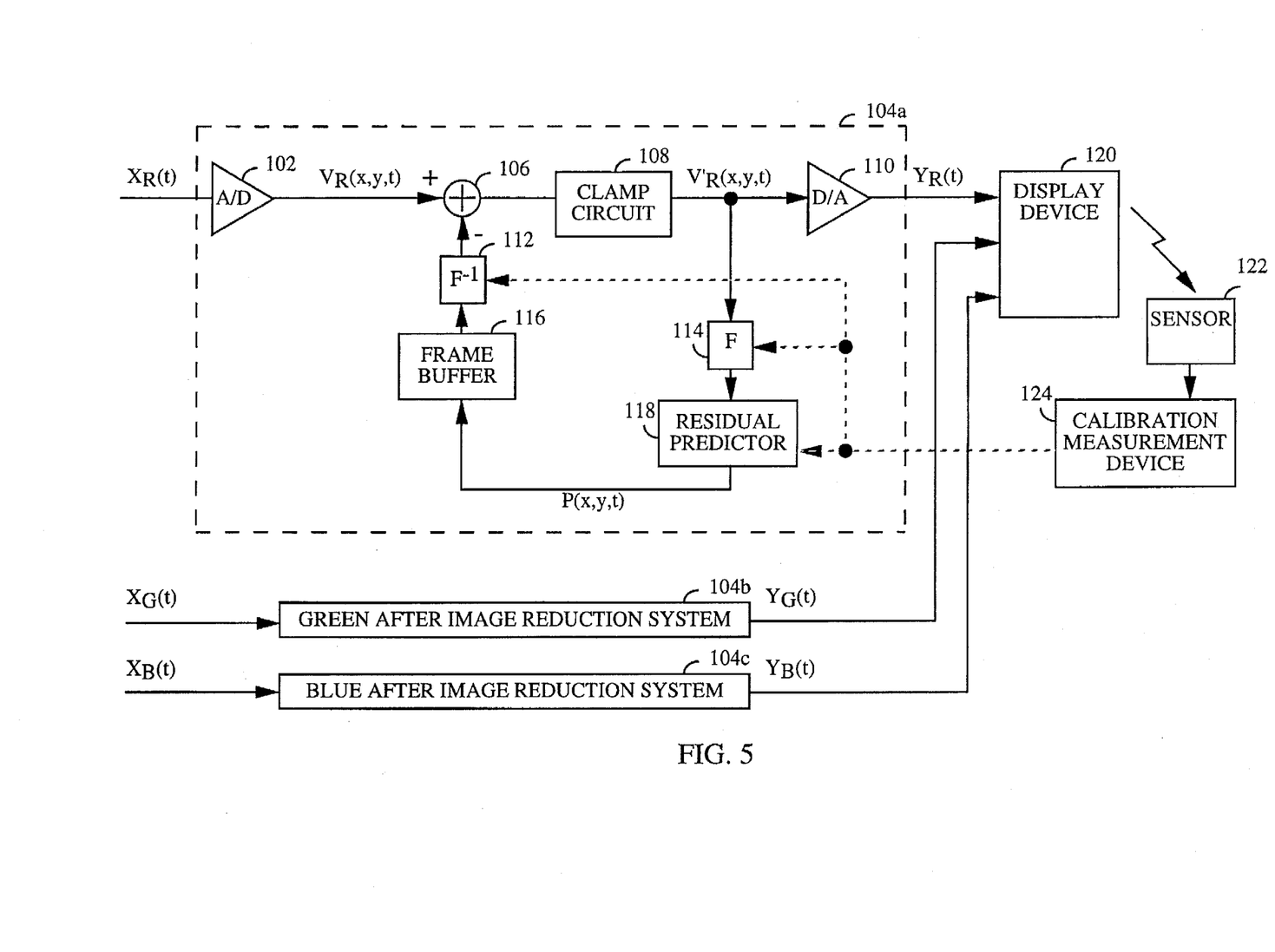
FIG. 5 is a block diagram of the present invention using a first order after image prediction.

FIG. 4 illustrates the video processing system in a finite impulse response (FIR) implementation in FIG. 4. In FIG. 5 this system is illustrated in an infinite impulse response (IIR) implementation. The IIR implementation of FIG. 5 is an approximation of the system in FIG. 4. The IIR implementation of FIG. 5 allows incorporation of corrections for the nonlinear characteristics of display device 120 and prediction of the after image in the feedback path. The estimate of the after image generated is stored in frame buffer 116 to synchronize the inputs to summer 106. The functions of each of these elements is described in greater detail below.

In FIG. 5, the video signal is a color signal presented to the present invention as three separate color signals. In the exemplary embodiment, the signals are presented as red, green and blue signals, shown as $X_R(t)$, $X_G(t)$ and $X_B(t)$, respectively. The red component of the video signal is provided to red after image reduction system 104a. Red after image reduction system 104a can be implemented using discrete logic or microprocessor or digital signal processor chip programmed to perform the function as described. In the exemplary embodiment, $X_R(t)$ is an analog signal. It should be noted that the present invention is equally applicable to any other set of colors and can also be used with black and white displays.

The after image reduction methods of the present invention are more easily realized in digital form, so in the exemplary embodiment, the analog signal $X_R(t)$ is transformed to digital signal $V_R(x,y,t)$ in analog to digital (A/D) converter 102. The digital signal, $V_R(x,y,t)$, represents the voltage applied to generate pixel light intensity for the pixel in display position (x,y) at time t. It should be noted that if the after image reduction system is used with an image reproduction device that processes the image digitally, then analog to digital converter 102 is not needed since the signal is already in digital form. For example, if the input signal $X_R(t)$ is output from a digital video decompressor in digital form, then analog to digital converter 102 is not needed.

The digital signal, $V_R(x,y,t)$, is presented to the summing input of summing element 106. In the exemplary embodiment all processing is performed digitally so summing element 106 in the exemplary embodiment is a digital adder, which can be implemented discretely or using a microprocessor or digital signal processor programmed to perform the summing operation.

Figure 6:
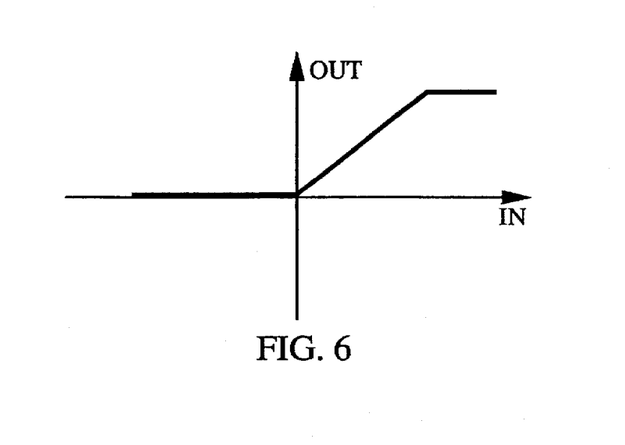
FIG. 6 is an illustration of the input output function of the clamping circuit.

The estimated after image of the preceding frame or frames is subtracted from the digital signal, $V_R(x,y,t)$ in summing element 106. The after image reduced signal output from summer 106 is provided to clamp circuit 108. Clamp circuit 108 passes through the value from summing element 106 if that value is positive and is set to zero if it is not. FIG. 6 illustrates the input/output characteristics of clamp circuit 108. Further details on an exemplary embodiment of clamp circuit 108 are provided later herein with reference to FIG. 7.

Clamp circuit 108 provides the range limited signal to digital to analog (D/A) converter 110 and nonlinear function calculator 114. Digital to analog converter (D/A) 110 converts the digital after image reduced signal to an analog signal, $Y_R(t)$, which is provided to display device 120. Again it should be noted that digital to analog (D/A) converter 110 is not necessary if incorporated within the display device or if the display device handles digital signals directly.

Nonlinear function calculator (F) 114 models the nonlinearities associated with display device 120. Nonlinear function calculator 114 receives the digital signal and generates a value which simulates the intensity of the resulting light that would be displayed by display device 120.

The value generated by nonlinear function calculator 114 is provided to residual predictor 118. Residual predictor 118 estimates the amount of the simulated light intensity from the current frame of pixel data which will remain as an after image in the next frame of data. The signal, P(x,y,t), is an estimate of the intensity of the after image that will be output by display device 120 in the subsequent frame. For example, if the system assumes a simple exponential decay for display device 120, then P(x,y,t) may be given by the equation:

$$P(x,y,t) = \alpha \cdot F(V'_R(x,y,t)), \qquad (3)$$

where $V'_R(x,y,t)$ is signal output from clamp circuit 108, F(x) is the nonlinear function which maps the applied signal to light intensity displayed by display device 120, and $\alpha$ is the scaling factor equal to the estimated percentage of the image that remains from the previous frame. In the exemplary embodiment, it is assumed that 10% of the light remains from the previous frame, so $\alpha$ is equal to 0.1.

The residual predictor in this most simplified example is simply a scaled version of the previous frame, scaled by the decay factor $\alpha$. A look-up table is one way in which to implement residual predictor 118, in which case the functions of residual predictor 118 can be combined with the function of nonlinear function calculator 114. In the exemplary embodiment, this combined device is implemented using a re-writeable memory device, such as a random access memory (RAM) device, that is loaded during a calibration process. Other memory devices well known in the art may also be used.

The after image estimates are provided to frame buffer 116 which stores the after image pixel data until the next frame of pixels begins to be provided to after image reduction system 104a. Frame buffer 116 is a memory device well known in the art. It should be noted that in the case of a first order after image reduction system, the positions of frame buffer 116 and residual predictor 118 can be interchanged. By interchanging frame buffer 116 and residual predictor 118, the memory requirements of frame buffer 116 can be reduced due to the reduced dynamic range of the signal. However, for a higher order after image reduction system (one where the prediction is based upon two or more preceding frames), the frame buffers have to follow the predictor.

The stored estimated after image pixel data is provided to inverse nonlinear function ($F^{-1}$) element 112. Inverse nonlinear function ($F^{-1}$) element 112 takes in the estimated after image pixel intensity and converts that light intensity related value to a voltage value that will result in that estimated after image pixel intensity. The converted value from inverse nonlinear function element 112 is provided to the subtracting input of summing element 106. The nonlinear function calculator 114 and inverse nonlinear function element 112 can be implemented using a look-up table in a RAM memory device or can be implemented using a digital signal processor or microprocessor programmed to compute the nonlinear functions. In the exemplary embodiment, the look-up table is loaded during the calibration process.

Green after image reduction system 104b and blue after image reduction system 104c operate in the same manner as red after image reduction system 104a. Green after image reduction system 104b receives the video signal for the green component of the video, $X_G(t)$, and outputs the after image reduced signal for the green component $Y_G(t)$. Similarly, blue after image reduction system 104b receives the video signal for the blue component of the video, $X_B(t)$, and outputs the after image reduced signal for the blue component, $Y_B(t)$.

The model of the image decay in residual predictor 118 and the nonlinear aspects of display device 120 used in nonlinear function element 114 and inverse nonlinear function element 112 are modeled using sensor 122 and calibration and measurement system 124. The calibration system measures the display characteristics directly off of display device 120, via sensor 122, using a set of test sequences provided to digital to analog converter 110. Sensor 122 can be implemented using a PIN diode focused on display device 120 or a larger area. In the exemplary embodiment, the training of residual predictor 118, nonlinear function element 114 and inverse nonlinear function element 112 is done by transmitting a bright frame of high intensity followed by a dark frame and measuring the intensity of the after image.

The intensity of the after image is detected at sensor 122 which provides a signal to calibration measurement device 124. Calibration measurement device 124 is synchronized with the frames of video data to accurately measure the intensity of the bright frames and the intensity of the after images that occur during the subsequent dark frames. Because calibration measurement device 124 knows a prion what data is being provided to display device 120, it can measure the nonlinear attributes of display device 120, as well as, the residual function of display device 120.

Calibration measurement device 124 also provides information regarding nonlinear attributes of display device 120 to nonlinear function element 114 and inverse nonlinear function element 112, and provides the information regarding the residual function of display device 120 to residual predictor 118. Measuring the nonlinear characteristics of the display can be done by monotonically increasing the voltage input to the display and measuring the intensity response.

Figure 7:
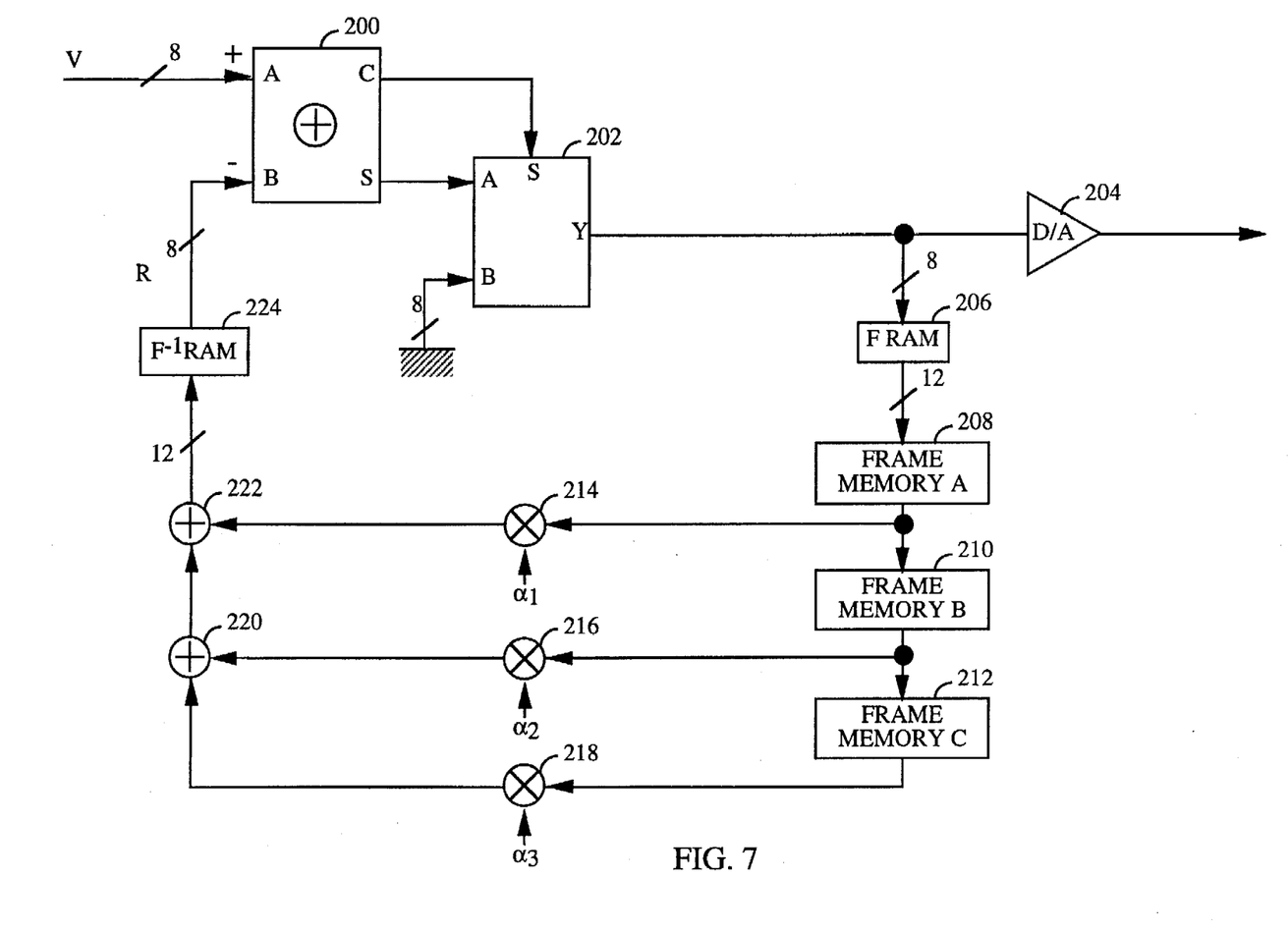
FIG. 7 is a block diagram of the present invention using a third order after image prediction.

FIG. 7 illustrates an exemplary implementation of the present invention as a third order after image reduction system for one color, such as red, green or blue. The input video signal V is provided to the summing input of adder 200. In the exemplary embodiment, the input video signal V is provided as an eight bit signal on a eight bit wide bus line. The estimated residual signal, R, is provided to the subtracting input of adder 200. In the exemplary embodiment, the estimated residual signal R is, also, provided as an eight bit signal on a eight bit wide bus line.

The difference between the input signal and estimated residual signal is provided at output S of adder 200, and the sign of the difference is provided at output C of adder 200. The magnitude of the difference between the input signal and estimated residual signal is provided to the A data input of multiplexer 202, which performs the function of the clamping circuit described above. The B data input of multiplexer 202 is grounded to provide an input of all zeroes.

The sign of the difference between the input signal and estimated residual signal is provided to the select (S) input of multiplexer 202. If the sign is positive then the difference between the input signal and estimated residual signal is output by multiplexer 202, whereas if the sign is negative then the all zeroes signal is output by multiplexer 202. Thus, multiplexer 202 performs the clamping operation so that the data provided to the display device (not shown) is non-negative.

The signal output by multiplexer 202 is provided to digital to analog converter 204. In the exemplary embodiment the signal output by multiplexer 202 is eight bits wide. Digital to analog (D/A) converter 204 converts the digital representation to an analog signal and provides the analog signal to a display device (not shown). Again, digital to analog (D/A) converter 204 is not necessary if the display device is configured to directly receive digital signals.

The signal output by multiplexer 202 is, also, provided to nonlinear function memory (FRAM) 206, which maps the voltage signal output by multiplexer 202 to a simulated intensity value as described above. In the exemplary embodiment, nonlinear function memory 206 is implemented in a random access memory (RAM) device. In the exemplary embodiment, the value output by nonlinear function memory 206 is provided as a 12 bit signal. The value output by nonlinear function memory 206 must be of adequate precision so that contouring artifacts and quantization related artifacts do not occur.

The value output by nonlinear function memory 206 is provided to frame memory A 208. Frame memory A 208 stores the frame of information pixel by pixel until the data for the next frame of data is about to come in. When the pixel data for the next frame is about to be provided to adder 200, frame memory A 208 outputs the image data pixel by pixel to scaling element 214 and to frame memory B 210. Similarly, when the pixel data for the next frame is about to be provided to adder 200, frame memory B 210 outputs the image data pixel by pixel to scaling element 216 and to frame memory C 212. At this time, frame memory C 212 provides its contents to scaling element 218. In the exemplary embodiment, frame memory elements 208, 210 and 212 are implemented using random access memory (RAM) devices that operate in a first in first out (FIFO) fashion.

In scaling element 214, the image data from frame memory A 208 is scaled by $\alpha_1$, where $\alpha_1$ is the estimated fraction of light intensity that remains from the previous frame. In scaling element 216, the image data from frame memory B 210 is scaled by $\alpha_2$, where $\alpha_2$ is the estimated fraction of light intensity in the current frame that remains from the frame two frames previous. In scaling element 218, the image data from frame memory B 212 is scaled by $\alpha_3$, where $\alpha_3$ is the estimated fraction of light intensity in the current frame that remains from the frame three frames previous. In the exemplary embodiment, scaling elements 214, 216 and 218 output 12 bit values.

The value output by scaling element 218 is added with the value output by scaling element 216 in summing element 220. The value output by summing element 220 is added to the value out of scaling element 214 in summing element 222. The value output by summing element 222 is the estimated after image light intensity that is provided to inverse nonlinear element ($F^{-1}$RAM) 224, which takes the value and converts it to a digital representation of the voltage value that when applied to the display device (not shown) would result in an image intensity of the third order estimate. This value is provided to the subtracting input of summer 200 and is subtracted from the current frame of image data.

Figure 8:
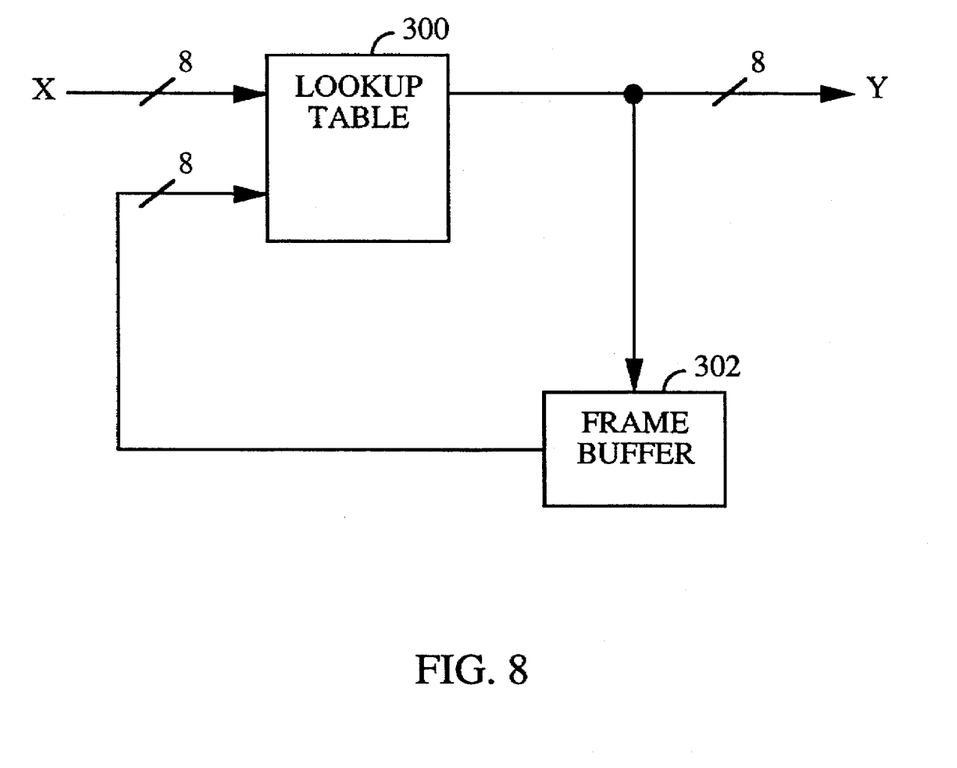
FIG. 8 is a block diagram of the present invention implemented using a look-up table.

Referring now to FIG. 8, the present invention may be implemented using look-up table 300 to perform the clamping operation, the accounting for nonlinearities in the display device (not shown), the residual prediction calculation, the subtraction, and quantization operations all for the first order after image reducer (e.g. 104a).

In the exemplary embodiment, the input pixel data, x, is provided on an 8 bit bus line to look up table 300. Look-up table 300 can be implemented using a programmable read only memory (ROM) or using a random access memory (RAM) device. The design and implementation of those devices is well known in the art. In the exemplary embodiment, look-up table 300 is implemented using a memory device capable of storing 64K×8 memory storage device. That is a memory device capable of storing 65,536, which is equal to 216 eight bit words.

Look up table 300 outputs the after image reduced data, y, in response to the input pixel data, x, and the output of frame buffer 302. In the exemplary embodiment illustrated in FIG. 8, the after image reduction system is a first order image reduction system as described above. However, it is envisioned that this implementation may be used in higher order implementations by providing a larger frame buffer 302 and look up table 300. In the implementation illustrated in FIG. 8, the training operation described above is used to load look-up table 300.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A motion video processing apparatus, comprising:

reduction means for receiving a frame of motion video data and processing said frame of motion video data in accordance with an after image estimate to provide an after image reduced frame of video data; and after image prediction means for receiving said processed frame of video data and for generating said after image estimate in accordance with a predetermined after image prediction format.

2. The apparatus of claim 1 wherein said after image prediction means generates said after image estimate based on a display device image characteristic.

3. The apparatus of claim 1 wherein said after image prediction means generates said after image estimate by amplitude scaling a predetermined set of previous frames of video data and summing the scaled set of previous frames of video data.

4. The apparatus of claim 1 wherein said after image prediction means comprises:

buffer means for receiving a previous frame of video data and for storing said previous frame of video data; and scaling means for scaling said previous frame of video data in accordance with a predetermined scaling format.

5. The apparatus of claim 1 wherein said after image prediction means comprises:

buffer means for receiving a plurality of previous frames of video data and for storing said previous frames of video data; and a plurality of scaling means each for receiving a corresponding data from a corresponding one of said plurality of previous frames of video data and for scaling said one of said plurality of previous frames of video data to provide a corresponding scaled frame; and summing means for receiving each of said scaled frames and summing said scaled frames to provide said after image estimate.

6. The apparatus of claim 1 further comprising nonlinear display compensator disposed before said after image prediction means for receiving said frame of motion video data and processing said frame of motion video data in accordance with a nonlinear display compensation format.

7. The apparatus of claim 2 wherein said after image prediction means generates said after image estimate by processing at least one previous frame of video data.

8. The apparatus of claim 6 further comprising inverse non-linear display compensator disposed after said after image prediction means for receiving said after image estimate and processing said after image estimate in accordance with an inverse nonlinear display compensation format.

9. The apparatus of claim 1 further comprising clamping means for receiving said after image reduced frame of video data and for processing said after image reduced frame of video data to provide a non-negative after image reduced frame.

10. The apparatus of claim 1 wherein said after image prediction format is determined by measuring the after image response of a motion video display.

11. The apparatus of claim 10 wherein said after image prediction format is determined by measuring the after image response of said motion video display and wherein said measuring the after image response of said motion video display is performed by displaying a set of test images designed to measure the lag and nonlinearity of the display device.

12. A method for motion video processing, comprising the steps of:

processing said frame of motion video data in accordance with an after image estimate to provide an after image reduced frame of video data; and generating said after image estimate in accordance with a predetermined after image prediction format.

13. The method of claim 12 wherein said step of generating said after image estimate is based upon a display device characteristic.

14. The method of claim 12 wherein said step of generating said after image estimate comprises processing a predetermined set of previous frames of video data and summing the scaled set of previous frames of video data.

15. The method of claim 12 wherein said step of generating said after image estimate comprises the steps of:

storing said previous frame of video data; and scaling said stored previous frame of video data in accordance with a predetermined scaling format.

16. The method of claim 12 wherein said step of generating said after image estimate comprises:

storing said previous frames of video data; and scaling each of said plurality of previous frames of video data to provide scaled frames; and summing said scaled frames to provide said after image estimate.

17. The method of claim 12 further comprising processing said frame of motion video data in accordance with a nonlinear display compensation format.

18. The method of claim 12 wherein said step of generating said after image estimate generates said after image estimate by processing at least one previous frame of video data.

19. The method of claim 17 further comprising processing said after image estimate in accordance with an inverse nonlinear display compensation format.

20. The method of claim 12 further comprising processing said after image reduced frame of video data to provide a non-negative after image reduced frame.

21. The method of claim 12 wherein said after image prediction format is determined by measuring the after image response of a motion video display.

22. The method of claim 21 wherein said after image prediction format is determined by measuring the after image response of said motion video display and wherein said measuring the after image response of said motion video display is performed by displaying a set of test images designed to measure the lag and nonlinearity of the display device.

23. A motion video processing system, comprising:

subtractor having a first input for receiving motion video data and having a second input for receiving an after image estimate and having an output; and residual prediction calculator having an input coupled to said subtractor output and having an output coupled to said second subtractor input.

24. The system of claim 23 further comprising a clamping circuit having an input coupled to said subtractor output and having an output.

25. The after image reduction system of claim 23 further comprising a nonlinear function calculator having an input coupled to said subtractor output and having an output coupled to said residual prediction calculator input.

26. The system of claim 23 further comprising an inverse nonlinear function calculator having an input coupled to said residual prediction calculator output and having an output coupled to said subtractor second input.

27. The system of claim 26 further comprising a frame buffer having an input coupled to said residual prediction calculator output and having an output coupled to said subtractor second input.

28. The system of claim 23 further comprising a frame buffer having an input coupled to said subtractor output and having an output coupled to said residual prediction calculator output.

29. The system of claim 23 wherein said residual prediction calculator comprises a multiplier having a second input for receiving a scaling factor.

30. A motion video processing system comprising:

frame buffer means for storing a processed frame of motion video data; and look-up means for receiving a frame of motion video data and said stored processed frame of video data and for outputting a subsequent frame of processed motion video data in accordance with said frame of motion video data and said stored processed frame of video data in accordance with an after image estimation lookup format.

* * * * *